United States Patent [19]

Villain

[11] 4,075,040
[45] Feb. 21, 1978

[54] TITANIUM AND TITANIUM ALLOY SURFACE PREPARATION METHOD FOR SUBSEQUENT BONDING

[75] Inventor: Roland Villain, Feucherolles, France

[73] Assignee: Societe Nationale Industrielle Aerospatiale, Paris, France

[21] Appl. No.: 705,480

[22] Filed: July 15, 1976

[30] Foreign Application Priority Data

Mar. 15, 1976 France .................................. 76 07375

[51] Int. Cl.² ............................................. C23F 7/06
[52] U.S. Cl. .............................. 148/6.14 R; 148/31.5; 134/3; 134/41; 156/664
[58] Field of Search ...................... 148/6.14 R, 6.15 R, 148/31.5; 250/311; 427/8; 134/3, 41; 156/664

[56] References Cited

U.S. PATENT DOCUMENTS

| 2,864,732 | 12/1958 | Miller et al. | 148/6.15 R |
| 3,041,215 | 6/1962 | Jenkins et al. | 148/6.14 R |
| 3,672,980 | 6/1972 | Glendinning | 427/8 |
| 3,687,741 | 8/1972 | Kendall | 148/6.14 R |
| 3,905,837 | 9/1975 | Du Bois | 148/6.14 R |
| 3,928,112 | 12/1975 | Hamilton et al. | 148/6.15 R |

OTHER PUBLICATIONS

B. Cox, Mater. Res. AECL (Canada), 50254 0123, (Spring 1970), Scanning Electron Microscopy, pp. 12-14.

Primary Examiner—Ralph S. Kendall

[57] ABSTRACT

The present invention relates to a titanium and titanium alloy surface preparation method, in which the surface to be treated is subjected to a preliminary degreasing and scouring operation and then immersed in a bath containing fluorides in an acid medium, after which the surface is rinsed in demineralized water at a temperature of at least 50° C. A nondestructive test is performed by means of a scanning electron miscroscope on the surface of the parts at certain stages in their processing in order to check for elimination, at the end of the treatment, of residual elements appearing in the course of the treatment. Parts prepared in accordance with this method can be bonded in strong and time-resistant fashion.

14 Claims, 4 Drawing Figures

× 3000

× 3000

X 3000

TITANIUM AND TITANIUM ALLOY SURFACE PREPARATION METHOD FOR SUBSEQUENT BONDING

The titanium alloy bonding difficulties encountered in industry, especially the aerospace industry, stem from the surface preparation of such metals.

It is known that the main difficulty resides in the in situ formation of an oxidation film which possesses at once strong reactivity to substances adhering to the surface — notably glues — and good stability through time even under sometimes severe high-temperature and humidity conditions.

This problem was partly overcome by a preparation process in a treatment bath which is defined under U.S. Specification MIL A 9067 c and described in U.S. Pat. No. 2,864,732, in accordance with which the following were contained in variable proportions in a bath at a temperature 25° C to 95° C:

$KF,2H_2O$: 20 to 84 g/liter
$Na_3PO_4,12 H_2O$: 35 to 160 g/liter
HF solution (immersion from 1 to 30 min): 11 to 30 ml/liter However, parts prepared in this way did not resist ageing too well, probably because the anatase formed initially turned with time into rutile. These structural changes, which are in fact accelerated by dampness, are hardly consistent with preservation of the physical properties of the treated surface.

Stabilizers of the lithium type have been used, but in point of fact they merely retard the ageing process without actually arresting the anatase-rutile transformation mentioned precedingly.

The applicant considered that the problem consisted in causing the formation of an in situ oxide layer which possessed a structure that was reproducible under given operating conditions and which was free enough of those substances used to create it the presence of which is considered incompatible with preservation of the overall surface properties.

Having noted the decay in performance through time of joints bonded by the prior art, even with moderate operating temperatures, the Applicant began to seek solutions in which the addition, into one of the surface treatment baths, of a fluoride in acid form could endow such surface with appropriate clinging properties in respect of all adhesive, whether organic or inorganic, and most notably adhesive of the polymer kind.

In accordance with this invention, such appropriate surfaces can be prepared by performing a succession of chemical operations involving baths especially suited to commercially pure T40, and T60 titanium and its principal alloys TA6V, TU2 and TA3V2,5.

Such surface preparations performed on parts consisting at least superficially of titanium or titanium alloys, are of three kinds:

1) scouring of the surface in order to rid it of foreign substances;
2) immersion in a bath containing fluorides in an acid medium, associated or not to alkaline and/or alkaline-earth metals and/or fluoric metallic complexes;
3) rinsing in a bath of demineralized water at a temperature of at least 50° C to eliminate the first layer obtained, consisting of a complex of titanium fluoride and associated metals and to permit the appearance of titanium hydroxides with sites that include reactive OH hydroxide groups in anatase form which, by reason of the method employed, possess great stability.

The oxide layer formed in this way possesses great adhesiveness in respect of the substance in contact with it, and more particularly a very high adhesiveness in respect of glues of the polymer type, such as those based on polyimides for example.

It may be noted that the second operation, consisting in treating the surface with fluorides, has already been proposed, notably in U.S. Pat. No. 2,881,106, in which reference is made to a pretreatment, before titanium parts are to be bonded, with an acid solution containing fluoride ions in the form of metal fluorides, and also in French Pat. No. 1,146,748 which describes a method of coating a titanium surface with an alkaline metal fluoride possibly containing a fluotitanate.

The third operation provides as necessary for a phase of elimination by hydrolysis of fluorides whose presence is judged to be incompatible with preservation of the overall surface properties, such presence being detrimental to the formation of a time-stable layer of anatase.

This in turn makes it necessary to be able to check for the existence, and more particularly the absence, of such residual elements on the surface of the parts being treated, in order to enable the adhesive to be deposited under the required conditions and thereby ensure the time-wise stability of the adhesive bond.

To this end, a nondestructive test is conducted on the surface condition of a part prepared in accordance with the above-described treatment, both after the second and after the third treatment operations.

This test consists basically in looking for the possible presence of the residual elements which normally appear after the second operation (when the part is immersed in a bath containing fluorides), by examining the surface of the part through a scanning electron microscope after the second operation and again after the third operation and comparing the results of these two consecutive examinations and thereby ensuring that said residual elements are no longer detectable by this examination method and have been eliminated.

The description which follows with reference to the accompanying non-limitative, examplary drawings will give a clear understanding of how the invention can be carried into practice.

Figure 3:
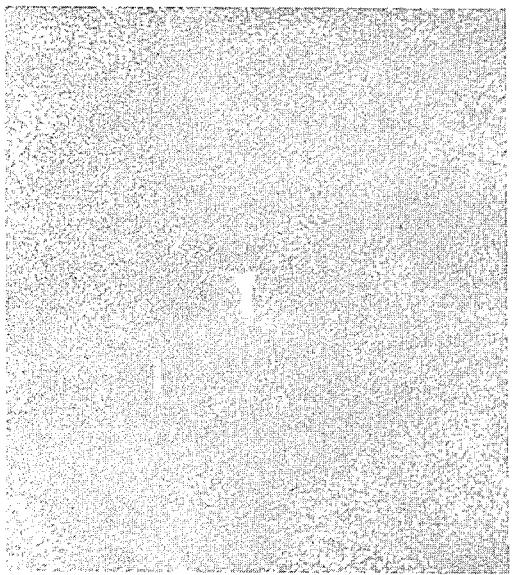
Figure 4:
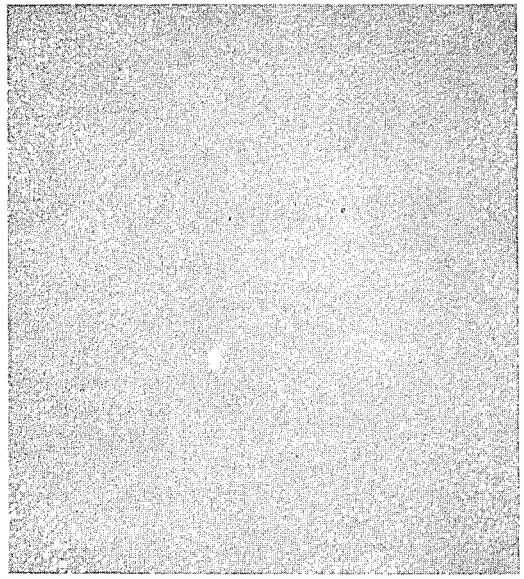

FIG. 3 is a photograph of the same area, using the same × 3000 magnification, showing an analysis of the X-fluorescence spectrum produced by a βexciter beam, with the object of revealing groups containing Na ions (the alkaline metal being sodium); and FIG. 4 is a photograph of the same area with the same × 3000 magnification, showing an analysis effected with natural fluorescence with the object of revealing groups containing F ions.

Figure 1:
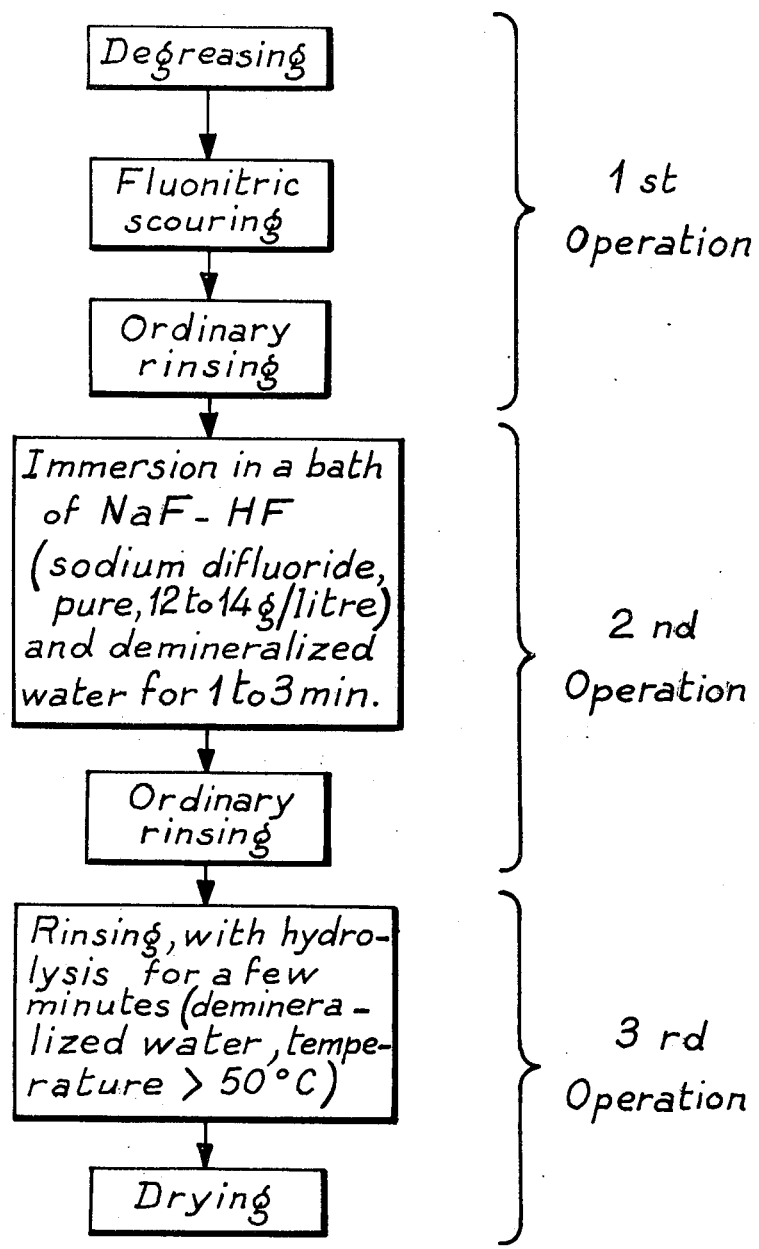
FIG. 1 is a flow chart of the subject surface preparation method of this invention, applicable in general fashion to titanium and titanium alloys.

Reference to FIG. 1 shows that the surface preparation of titanium requires, in accordance with the Applicant's method, an initial operation involving a degreasing (followed preferably by rinsing in water for 1 to 2 minutes and subsequent possible drying), and then a fluonitric scouring and an ordinary rinsing in demineralized water for one or two minutes.

This initial operation is intended primarily to provide a surface substantially free of foreign substances. It is followed by a second operation consisting in an immersion in a bath of sodium difluoride proportioned between 12 g per liter of Naf - HF, for a period of 1 to 3 minutes, followed by an ordinary rinsing.

The third operation, which consiste in rinsing for a few minutes in demineralized water at a temperature of at least 50° C, leads through hydrolysis to the elimination of the undesirable elements produced during the second operation.

Checking for proper elimination of these elements is effected by examining the surface of the titanium with a microscope. This examination, performed with a JEOC - JS MU3, 5– 50 keV scanning electron microscope with a magnification of × 3000, can be carried out on any surface containing residual elements following immersion in the fluoride-charged bath.

By the final stage in the second operation, the surface examination will already reveal the weight distribution of the fluorite possibly associated with other residual elements.

Figure 2:
FIG. 2 is a photograph showing the surface aspect of a part made of T40 titanium, examined under a scanning electron microscope with a magnification of × 3000.

FIGS. 2 to 4 are photographs obtained during such an examination of a piece of titanium alloy designated T40, the percentage breakdown of whose composition is as follows:

$C \leq 0.08$; $Fe \leq 0.25$; $H_2 \leq 0.0125$; $N_2 \leq 0.06$; $O_2 \leq 0.25$; Ti : the remainder.

As shown in FIG. 2, the photograph, which merely shows the surface aspect, reveals the presence of complex salts of Ti, Na, F, after the second operation has been performed in accordance with the above-mentioned procedure.

The photograph in FIG. 3 then shows, in the form of white blemishes, the distribution, over the same part of the surface, of the groups containing Na ions viewed by X-fluorescence produced by a $\beta$ exciter beam. It is to be noted that the central blemish is due to a heavy concentration of Na ions.

Lastly, the photograph in FIG. 4 shows, again in the form of white blemishes, the distribution, over the same surface area, of the groups containing F ions viewed by normal fluorescence. It should again be noted that the central blemish is due to heavy concentration of F ions.

Clearly, a quantitative proportioning of the Na and F ions could readily be effected on the basis of such examination means.

The photographs in FIG. 3 and 4, which were taken after the third operation, appear black for a proper elimination of the undesirable elements because these residual elements exist in a quantity below the detection threshold of the method employed.

Consequently a comparison between the photographs taken after the second and third operations respectively will indeed provide the required verification means for revealing whether or not the third operation has been applied, and correctly so.

The test method hereinbefore described is comparatively easy to implement, but it is to be understood that the scope of the invention includes any other convenient means based on related techniques to achieve the same results.

By way of example, the Applicant has found that two titanium alloy plates of the TA 6V kind, the surfaces of which have been prepared in accordance with this invention, can be bonded together over an area of 3 cm² by means of a polimide glue and, after an ageing period of approximately 2000 hours at 250° C, possess a shear strength of about 500 kg at 250° C.

By way of a non-limitative example in the case of a metal such as TA6V4, it is possible to effect an alkaline degreasing, by means of washing agents consisting of mixtures of phosphates and alkaline carbonates, using tensio-active substances. This washing is followed by a rinsing in ordinary cold running water, which is adequate. The next step is to effect a scouring of the surface of the treated metal, with degreasing and rinsing in a fluonitric bath, for example, such bath containing 50% by volume of nitric acid at 36° B, i.e. of density 1.38, 2% by volume of hydrofluoric acid at 40% by volume, the remainder being water. The temperature of such scouring-degreasing bath is included between ambient temperature and +60° C. Choice of the temperature will depend on the time lapse desired before the required result is obtained.

Such scouring-degreasing is followed by abundant rinsing in ordinary running water. This rinsing may be carried out in a possibly agitated bath, or by projection or sprinkling.

It goes without saying that if the surfaces to be treated are originally cleanly formed, the aforesaid operations can be dispensed with, such as when said surfaces are machined with a cutting tool or a grinding wheel without the use of a cooling liquid, or when such liquid is completely volatile, an example being a fluorine or chlorine-containing derivative of methane or ethane, usually known by the name "Freon."

In order to prepare surfaces suitable for bonding, the first step is to effect an immersion, in a bath at a temperature lying between 18° C and 25° C and possibly containing a concentration of 10 to 14 grammes of sodium difluoride per liter of dissolution water, of the surfaces to be treated for a time included between 30 seconds and 5 minutes depending on the temperature of the bath. The reaction which is performed is accompanied by a release of hydrogen and the formation of a greyish black coloured layer and loss of the metallic aspect, and these phenomena provide a first visual check over the operations.

If the appearance of an overly abundant greyish black layer is noted that might prove lacking in adhesiveness, the operations could be repeated from the scouring-degreasing stage and involve a lower level of difluoric attack, this being achieved either by reducing the dwelling time, reducing the temperature, or reducing the concentrations, the aim at all times being to retain ease of handling at industrial level, in conjunction with easy-to-monitor times within the required tolerances.

On issuing from this bath, the parts are cold-rinsed in ordinary water or demineralized water in order to avoid introducing ions which could be harmful either immediately or in the longer term if the available supply of ordinary water contained any.

The results obtained with an adhesive substance and a shear strength test on standard test specimens, by comparison with a surface/preparation by sanding in the case of TA6V4, have been as follows:

sanding at ambient temperature : failure under a load of 4200 Newtons above-described treatment at ambient temperature : failure under a load of 8100 to 8400 Newtons, the adhesive substance employed being that produced by the Rhone-Poulenc company under the designation IPA 380.

At a temperature of 250° C the results would be 3900 to 4200 Newtons and 7200 Newtons respectively.

With a different adhesive substance, on TA6V4 metal treated according to the advocated method and treated by blue anodic oxidation respectively, the figures would be in the region of 15,000 Newtons and 6000 Newtons respectively.

In the case of adhesive substances suitable for use as painting primers on similar metals with a very high titanium content, treatment by the known phosphate/fluoride method results in a perpendicular rip-off force after damp ageing under heat of 156 Newtons, whereas the subject preparation treatment of this invention makes it possible to obtain, under similar conditions, a force of 215 Newtons, assuming equivalent surfaces. An example concerne the case of epoxy paints such as those used in the aircraft industry.

The present invention is by no means restricted to the kind of adhesive substance formed by the coating on a titanium surface and manifestly includes in its scope any substance in respect of which the surface preparation method hereinbefore described will result in enhanced adhesive strength.

Thus the invention can be applied to increase the adhesiveness to titanium or titanium alloys of other organic or inorganic substances such as paints, dopes, varnishes, sublayers, enamels, vitrification substances, fibre deposits or metallic deposits, or else to facilitate subsequent metallurgical operations such as resistance welding, diffusion or hot pressure bonding, weld-brasing or brazing.

Likewise, any bath preparation capable of producing the same surface preparation results falls within the scope of the present invention.

What I claim is:

1. A method of surface treatment of articles containing titanium or its alloys preparatory to bonding with adhesives, comprising the steps of: 1) degreasing and scouring the surface of said articles; 2) immersing said degreased and scoured article in an aqueous acidic bath consisting essentially of from 0.16 to 0.23 mole per liter of fluorides of metals selected from the group consisting of the alkali metals and the alkaline earth metals; and 3) hydrolysing of the resulting surface coating in demineralized water at a temperature of at least 50° C. for a time sufficient to obtain a layer of substantially pure anatase containing superficial OH sites for said adhesive.

2. The method according to claim 1, in which the aqueous acidic bath containing fluorides, consists of fluorine-complexes of titanium or metallic alloys of titanium.

3. The method according to claim 2, including the steps of examining the surface of said article for the presence of residual elements thereon after completion of step 2) and after completion of step 3), and comparing the results of these two successive examinations, and continuing said hydrolysis until said residual elements are no longer detectable.

4. The method according to claim 3, wherein said examination is accomplished by the use of an electron scanning microscope.

5. The method according to claim 4, wherein the examination is accomplished by the use of the said microscope by X fluorescence in response to a beta exciter beam.

6. The method according to claim 4, wherein the examination is accomplished by use of the said microscope in response to natural fluorescence.

7. The method according to claim 1 in which the aqueous acidic bath contains 10 to 14 g/l of NaF-HF, the temperature of the bath is between 18° and 25°., and the article is immersed therein for a period of time between 30 seconds to 5 minutes and including the step of thereafter rinsing said article in cold water.

8. The method according to claim 3, in which the cold rinse is done in dimineralized water.

9. The method according to claim 1, including the step of depositing an organic material on the layer of pure anatase containing reactive OH sites.

10. The method according to claim 9 in which the organic material is a polyimide-base glue.

11. The method according to claim 1, including the step of depositing a mineral material on the layer of pure anatase containing reactive OH sites.

12. The method of treatment according to claim 1, in which the degreasing is obtained by immersion in an alkaline solution comprising phosphates and alkaline carbonates, before subsequent rinsing in cold, ordinary water.

13. The method of treatment according to claim 1, in which the scouring is executed in a fluor-nitric bath containing 50% by volume of nitric acid at a concentration which corresponds to the density of 1.38 degrees Baume, and 2% by volume of hydrofluoric acid having a concentration of 40% by volume, the rest of the bath being water, the said bath being at a temperature between ambient temperature and +60° C,. this scouring being followed by a rinsing in cold, ordinary water.

14. Metallic articles constituted of titanium or its alloys, treated by the method according to claim 1.

* * * * *